Figure 1:
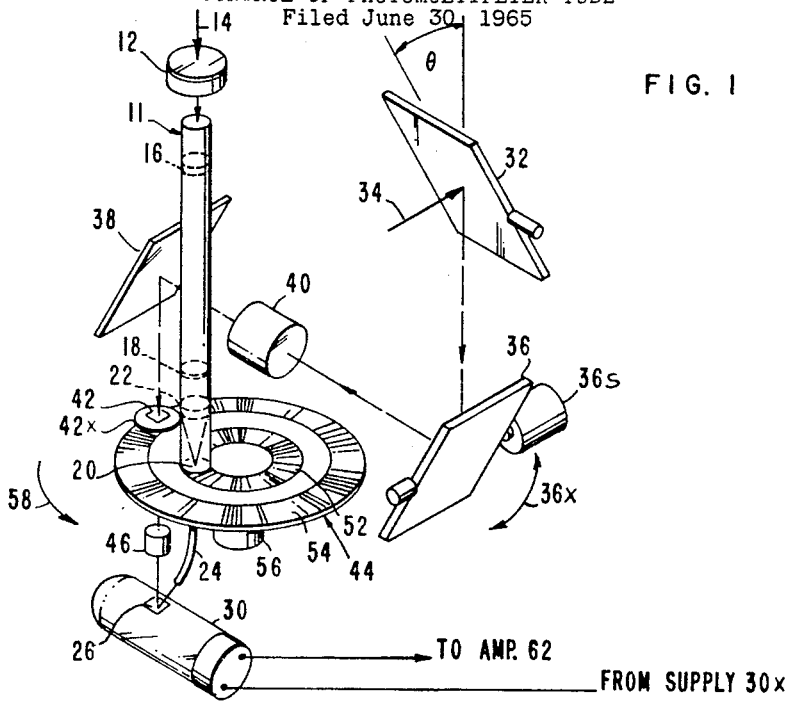

May 2, 1967

J. E. WEBB  
ADMINISTRATOR OF THE NATIONAL AERONAUTICS  
AND SPACE ADMINISTRATION  
CANOPUS DETECTOR INCLUDING AUTOMATIVE GAIN  
CONTROL OF PHOTOMULTIPLIER TUBE 3,317,731

Filed June 30, 1965

INVENTORS  
DARYL D. ERRETT  
EUGENE W. PETERSON

BY  
ATTORNEYS

United States Patent Office
3,317,731
Patented May 2, 1967

3,317,731
CANOPUS DETECTOR INCLUDING AUTOMOTIVE GAIN CONTROL OF PHOTOMULTIPLIER TUBE
James E. Webb, Administrator of the National Aeronautics and Space Administration, with respect to an invention of Daryl D. Errett and Eugene W. Peterson, both of Santa Barbara, Calif.
Filed June 30, 1965, Ser. No. 468,647
11 Claims. (Cl. 250—203)

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates generally to star sensors, and more particularly to an improved star sensor using sunlight as a reference for discriminating between stars.

One of the basic requirements of controlling the course of an unmanned spacecraft or vehicle in space is to control the attitude of the vehicle with respect to a reference plane, from which navigational maneuvers can be programmed. One plane which could be used for such purposes is a plane which includes the direction of the vehicle toward the sun, hereafter referred to as the sun axis and the direction of the vehicle to the star Canopus, hereafter referred to as the star axis. As is well known, the star Canopus which is the second brightest star in the heavens lies about 14° from the perpendicular to the ecliptic plane which is the plane in which the earth rotates about the sun.

With presently known techniques, sun sensors may be used to control the pitch and yaw of the space vehicle about the sun axis. Also, the roll attitude may be controlled by first sensing Canopus with a star sensor and then tracking Canopus so that the attitude of the vehicle is controlled with respect to the reference plane which includes the sun and star axes. Once the vehicle is positioned with respect to such a plane, any navigational maneuvers may be performed with respect thereto.

Various devices are presently known which are capable of sensing and tracking the sun. However sensing a selected star such as Canopus from the rest of the stars is quite complex requiring a very precise star sensor which is capable of discriminating between light from Canopus and the rest of the stars in the heavens.

Accordingly, it is an object of the present invention to provide a star sensor which is capable of sensing a particular star.

Another object of the present invention is the provision of a star sensor which is capable of distinguishing the star Canopus from the rest of the light radiating bodies in the heavens.

A further object of the invention is to provide a highly reliable sensor to distinguish the star Canopus from the rest of the stars in the heavens and then track it so that the light therefrom can be used to control the attitude of a space vehicle.

Still a further object of the invention is the provision of a novel Canopus star sensor which senses Canopus and controls the roll attitude of a spacecraft as a function of light received from Canopus, the pitch and yaw attitudes of the craft above a sun axis being controlled by sun sensors.

These and other objects of the invention are achieved by providing a star sensor which includes a light sensitive element such as a photomultiplier, the output of which is made a function of not only light received from an unknown star which is in the field of view of the sensor, but which is also a function of light received from the sun. The light from the sun is used as a reference with respect to which the light received from an unidentified star is measured. It has been found that Canopus is not only ideally located as a navigational reference (by being in a direction which is nearly perpendicular to the ecliptic path), but is also the second brightest star in the sky and differs by nearly one magnitude from the brightest and third brightest stars.

In the sensor of the present invention, the light from the sun is used to control the operation or gain of the photomultiplier so that the amplitude of the output signal therefrom is related to the ratio of illumination by a star in the field of view of the sensor and the sun. Knowing the relative intensity of Canopus with respect to the sun and the other stars, the expected amplitude of the photomultiplier when Canopus is in the field of view of the sensor is known. Thus, the sensor of the invention includes a Canopus indicate circuit which produces a predetermined signal only when the amplitude of the photomultiplier's output falls between two preset thresholds of approximately ±.05 magnitudes from Canopus' nominal intensity, thereby indicating that Canopus is in the field of view of the sensor. Once Canopus is sensed, the roll attitude of the vehicle is controlled by maintaining the light therefrom at a predetermined point in the field of view of the sensor.

The use of light from the sun as a reference with which light from unknown stars is compared has greatly increased the reliability with which the star Canopus may be distinguished from the rest of the stars in the heavens. Since sensing the sun is relatively easy, once Canopus is distinguished from the rest of the stars, the desired reference plane is produced about which selected course correction maneuvers may be performed.

Figure 2:
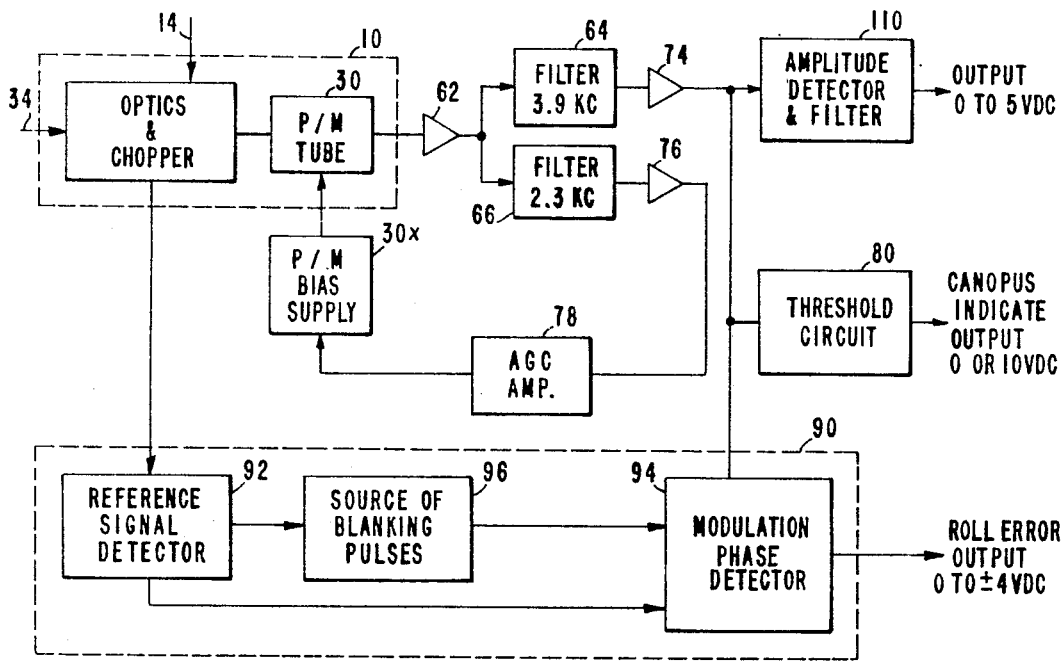

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a diagram of the optical portion of the novel sensor of the present invention; and FIGURE 2 is a block diagram of the circuitry of the sensor of the invention.

For a better understanding of the novel star sensor of the present invention, hereafter, the sensor will be described in conjunction with the star Canopus, which is first sensed and thereafter tracked to control the roll attitude of a space vehicle. However, it will be appreciated that the sensor disclosed herein may be used to sense any body which radiates light differing by a predetermined magnitude from light from other bodies, so that when a signal between predetermined thresholds is received, it indicates that the particular body is within the sensor's field of view.

As previously indicated, Canopus, which lies about 14° from the perpendicular to the ecliptic plane, is ideally suited to be used in controlling the attitude of a space vehicle in a trajectory in the ecliptic plane. It is assumed that a vehicle includes a sensing system which comprises a sun sensor used to sense the sun and control the pitch and yaw of the vehicle about the direction towards the sun, i.e. the sun axis. Once this is accomplished by known techniques, the vehicle is caused to rotate or roll about the sun axis. The sensing system is also assumed to incorporate the novel star sensor of the present invention.

As the vehicle rolls about its sun axis, different stars enter the field of view of the sensor. The sensor, as will be explained hereafter in detail, is designed to accurately distinguish between light from Canopus and other stars, namely, discriminate between Canopus and the other stars. Once it is determined that Canopus is in the sensor's field of view, the sensor tracks or locks unto Canopus to control the roll of the vehicle by maintaining Canopus in the center of its field of view. Any deviation from the center produces a roll error signal which is fed to a roll attitude control circuit in order to correct the vehicle's roll attitude.

Attention is now called to FIGURE 1 which is a simplified diagram of the optical portion of the novel sensor of the invention. The cover of the sensor is removed to reveal the internal structure thereof. As seen, the sensor of the invention includes an optical telescopic-like tube 11, with a sunlight filter 12 positioned near one opening thereof. Sunlight designated by solid arrow 14 enters the tube 11 through the filter 12 which may include a glass diffuser to allow for small variations in the incidence angle of the sun's rays. Lenses 16 and 18 focus the sunlight unto a pinhole exit 20 through a color correction filter 22. The sunlight emerging from the pinhole exit 20 passes through a chopper disc 44 and is directed by means of a fiber optics light pipe 24 to a select incremental area 26 of a photomultiplier 30. The function of filters 12 and 22 is to control the intensity and color of light from the sun which is directed to the area 26 of photomultiplier 30. The intensity and color of the sunlight are controlled to equal that of the light from Canopus in order to minimize shot-noise of the photomultiplier 30 and further insure that any gain changes of the photomultiplier will equally affect the sun and star signals.

Light from the star Canopus is directed unto the incremental area 26 by means of an optical assembly which includes an adjustable acquisition mirror 32. As previously pointed out, Canopus is at about 14° from the perpendicular to the ecliptic path or plane. By coincidence, the maximum angle between the direction to the sun and Canopus of 104° occurs at approximately the winter solstice and the minimum angle of 76° occurs at the summer solstice. Knowing the position in space at which navigational maneuvers are to be performed, the angle which Canopus makes with the direction to the sun is known. Prior to the mission, the mirror 32 is adjusted to be at such desired angle with respect to the sun sensors of the sensing system so that after the sun is sensed and the pitch and yaw of the vehicle are controlled, light from Canopus may be directed thereto. In FIGURE 1, the angle $\theta$ represents the possible adjustment of the mirror 32.

Light designated by arrow 34 from Canopus or any unidentified light radiating body is reflected by the mirror 32 to scan mirror 36 and therefrom to a folding mirror 38 through a lens 40. The function of mirror 36 will be explained hereafter in conjunction with tracking the star Canopus to provide roll attitude control signals. The function of lens 40 is to focus the light from an unidentified body through an aperture 42 in a plate 42x placed upon the chopper disc 44. The focused light is then guided by a pair of lenses 46 to the incremental area 26 of photomultiplier 30.

As is known in the art, the photomultiplier 30 produces an output which is related to the intensity of the light directed unto the incremental area 26. Since in the present invention the light at area 26 is from both the sun and an unidentified star, it is necessary to provide means to separate the effect of the sunlight on the photomultiplier and that produced by the light from the star. This is accomplished by means of a pair of light choppers 52 and 54 on the chopper disc 44 rotatably driven by a chopper motor 56 in a direction of arrow 58. In one embodiment, the sunlight is chopped by chopper 52 at 2.3 kilocycles (kc.) and the light from the unidentified star is chopped by chopper 54 at 3.9 kc.

Reference is now made to FIGURE 2 which is a block diagram of the circuitry of the novel sensor of the present invention, used to analyze the output of photomultiplier 30 in order to produce the desired control signals. The block designated by numeral 10 represents the arrangement shown in FIGURE 1. As seen, the output of tube 30 in response to sunlight (arrow 14) and light (arrow 34) from an unidentified star is supplied to an amplifier 62. The amplifier 62 is connected to filters 64 and 66, the respective outputs of which are connected to amplifiers 74 and 76. The function of filters 64 and 66 which are centered at frequencies 3.9 kc. and 2.3 kc. respectively, is to separate the output of the photomultiplier 30 into two signals related to the light from the sun and the unidentified star respectively. Thus, the amplitude of the output of amplifier 74 is related to the intensity of the star and the output of amplifier 76 is related to the intensity of the sunlight.

The output of the amplifier 76 is supplied to the bias supply 30x of the photomultiplier 30 through an automatic gain control (AGC) amplifier 78. The function of the sunlight is to control the gain of the photomultiplier 30 by controlling the high voltage or bias of the photomultiplier by the output of the AGC amplifier 78, which in turn responds to the sunlight signal of amplifier 76. In one embodiment of the invention, the sun channel is maintained at 5.4 volts peak-to-peak by the AGC amplifier. Once the sunlight controls the gain of the photomultiplier, the output of amplifier 74 is directly proportional not merely to the intensity of the starlight but rather to the ratio of the illumination of the star and the sun.

As previously stated, the brightness of Canopus relative to the brightness of the sun differs by approximately one magnitude from the brightest and third brightest stars. Thus, by determining the relative brightness of Canopus with respect to the sun, the expected output of the amplifier 74 when Canopus is in the sensor's field of view is determined. The sensor of the present invention includes a threshold circuit 80 to which the output of amplifier 74 is supplied. The circuit 80 includes conventional threshold circuits which are set to produce a particular output signal, such as +10 volts D.C. only when the output of amplifier 74 is between two preset threshold levels of +0.5 magnitudes from Canopus' nominal intensity. Since the relative brightness of Canopus differs by approximately one magnitude from the brightest and third brightest stars, only when Canopus is in the field of view of the sensor will the output of circuit 80 be +10 volts. Light from any other star, whether brighter or dimmer than Canopus by approximately one magnitude, will cause amplifier 74 to produce outputs which fall below or above the threshold levels, causing the threshold circuit to produce an output signal which differs from 10 volts, such as 0 volts. Thus, as long as the output signal of threshold circuit is zero volts, the light in the sensor's field of view is not from Canopus. Only when Canopus is in the field of view does the output signal become 10 volts, thereby indicating that Canopus has been located.

It has been found that the use of sunlight to control the gain of the photomultiplier and therefore the output signal from amplifier 74 is particularly significant in discriminating between Canopus and other stars. In essence, the sunlight is used as a reference to discriminate between light from a particular star, such as Canopus, and the rest of the stars. In fact, any star whose brightness differs by known magnitudes from other brighter or dimmer stars may be detected by adjusting the thresholds (in circuit 80) so that when the output of amplifier 74 falls between such thresholds, it is known that light from the particular star is received.

It should be appreciated that the precision with which the sensor can discriminate Canopus from the other stars is primarily determined by the accuracy with which the ratio of Canopus' intensity outside of the atmosphere and that of the sun can be determined and set into the threshold circuit 80, in the form of the threshold levels. Unfortunately, Canopus is only barely visible in the Northern Hemisphere, but it is visible in the Southern Hemisphere where measurements on its relative brightness with respect to the sun and other stars, such as Sirius, can be made to determine its relative brightness.

Reference is again made to FIGURE 2 wherein the novel sensor of the present invention is shown including a roll control circuit 90. The function of circuit 90 is to control the roll of the vehicle about the sun axis by maintaining the star Canopus at the center of its field of view. As previously pointed out, the sensor includes a scan mirror 36 which reflects the starlight to the lens 40. The mirror 36 is coupled to a scanning driving circuit 36s (FIGURE 1). Circuit 36s is assumed to include a synchronous motor to provide the mirror, by means of a coupled cam, an angular motion which is constant except in the vicinity of maximum amplitude where the direction of motion is changing. The motion of the scan mirror 36 causes the image of any object viewed by the lens 40 to move in the roll direction indicated in FIGURE 1 by arrow 36x slightly more than ±2.0°. The dimension of aperture 42 in the roll axis is limited to 4°. A star will pass in and out of the field of view during portions of each scan mirror cycle depending upon its direction relative to the roll axis of the optical system.

In synchronism with the scan mirror motion, the angle of the mirror 36 with respect to its center position, is sensed to energize a reference signal detector 92 to provide a "plus" or "minus" gating signal depending upon the angle of the mirror with respect to its center position. The plus and minus gating signals which form a reference square wave signal is supplied together with the modulated starlight from amplifier 74 to a modulation phase detector 94. The detector compares the modulation envelope of the starlight signal with the reference square wave signal and delivers a D.C. output proportional to the position of the star along the roll axis. The phasing may be controlled so that detector 94 produces an output voltage of 0 to ±4 volts D.C. as a function of the position of the star in roll axis with respect to the center of the field of view. By controlling the sensor so that the output of detector 94 is zero, the star is always in the center of the field of view. The roll control circuit 90 also includes a source of blanking pulses 96 which are generated in response to the square wave signal from detector 92 to inhibit the detector 94 from responding to the output of amplifier 74 when the motion of the scan mirror is reversed.

From the foregoing, it should thus be appreciated that the present invention provides a novel star sensor which uses sunlight as a reference to discriminate between light from a particular star and light from other light radiating bodies. The sensor comprises a sun channel which is used to control the gain of a photomultiplier which produces an output to a star channel which is directly proportional to the ratio of illumination by the star and the sun. By properly attenuating the sunlight, shot-noise of the amplifier is minimized. Further, by equating the intensity and color of the sunlight to the expected light from the particular star and by directing the sunlight and starlight unto the same incremental area of the photomultiplier, any gain changes of the photomultiplier equally affect the star and sun signals.

The sensor includes a thresholding circuit which produces a particular output (10 volts) only when a particular star, such as Canopus, is in the field of view. The sensor also includes a roll control circuit which produces an output which is useable to control the roll attitude of the space vehicle about the sun axis by detecting deviations of light from Canopus with respect to the center of the sensor's field of view.

In addition to the foregoing, the output of amplifier 74 may be supplied to an amplitude detector and filter circuit 110. The output of circuit 110 is controlled to be a D.C. signal, the amplitude of which is at all times related to the intensity of the light from any star in the field of view of the sensor.

There has accordingly been shown and described herein a novel star sensor which is capable of accurately discriminating between light from a particular star and light from any other light radiating bodies. Sunlight is used as a light intensity reference to control the sensitivity of the sensor to light from unidentified sources so that only when light from a particular source which varies by a known magnitude from all other light sources is in the sensor's field of view is a particular output produced. Although the invention has been described with specific examples, it should be appreciated that those familiar with the art may make modifications in the arrangements as shown without departing from the spirit of the invention which is claimed in the appended claims.

What is claimed is:

1. A star sensor for discriminating between light from a selected star of a predetermined brightness and light from other light radiating bodies, the light from said other bodies differing from the light from said selected star by a predetermined magnitude comprising:
   light sensitive means;
   sun means for directing sunlight to said light sensitive means;
   means for controlling the output of said light sensitive means as a function of said sunlight directed thereto;
   optical means having a predetermined field of view for directing light from a light radiating body in the field of view thereof to said light sensitive means; and
   means including threshold means for providing an output which is directly proportional to the ratio of the illuminations of the sun and the light radiating body, said output being between predetermined threshold levels when said selected star is in the field of view of said optical means.

2. The star sensor of claim 1 wherein said threshold means include means for providing a signal of a predetermined amplitude only when said output is between predetermined limits.

3. A sensor for discriminating between light within a predetermined intensity range and light outside said intensity range comprising:
   light intensity sensitive means;
   reference means for controlling with reference light of a predetermined intensity the sensitivity of said light intensity sensitive means to intensity of light directed thereto, said sensitive means providing a signal which is related to the intensities of said reference light and the light directed thereto; and
   means for producing a first output signal in response to light directed to said light intensity sensitive means of an intensity within said predetermined range when the signal from said sensitive means is within predetermined levels and for producing a second output signal when the signal from said sensitive means is outside said predetermined levels indicating that the light directed thereto is of an intensity outside said predetermined range.

4. The sensor of claim 3 wherein said reference light is sunlight, said reference means including means for attenuating the sunlight, and means for directing said attenuated sunlight to said light intensity sensitive means.

5. The sensor of claim 4 further including for modulating said attenuated sunlight and light directed from an unidentified light radiating body; and means for separating the output of said sensitive means into a first output related to the attenuated sunlight and a second output which is directly proportional to the ratio of the intensity of light from said unidentified body and the attenuated sunlight.

6. A star sensor for discriminating between a selected light radiating star and the rest of the light radiating stars in the heavens by discriminating between the relative intensity of light received from said selected star which is within a predetermined intensity range and the relative intensities of light received from the other stars comprising:
   light intensity sensitive means;
   means for receiving sunlight;
   means for attenuating the received sunlight to be of a predetermined intensity;

means for energizing said sensitive mean with said attenuated sunlight to control the sensitivity of said sensitive means to the intensity of light directed thereto from an unidentified body;

means having a selected field of view for receiving light from an unidentified body;

means for energizing said sensitive means with the light from said unidentified body to provide an output signal which is proportional to the ratio of the intensity of light from said unidentified star and the sun, said sensitive means providing an output signal of an amplitude within preselected levels when the intensity of light from said unidentified body is within said predetermined range; and thresholding means responsive to the output signal of said sensitive means for providing a signal of a predetermined amplitude indicative of said selected star being within the field of view of said star means only when the amplitude of the output signal of said sensitive means is within said predetermined levels.

7. The star sensor of claim 6 further including means for modulating the light received from said star; and means responsive to said modulated light for providing a signal related to the direction of light from said star and the center of said field of view.

8. A star sensor for sensing a selected star out of the rest of the stars in the heavens by discriminating between the light from said star which differs in intensity by a predetermined magnitude from the intensities of light from the rest of the stars comprising:

light sensitive means;

means for receiving sunlight including filter means for attenuating said sunlight to be of an intensity related to the expected intensity of light from said selected star;

means for energizing said light sensitive means with said attenuated sunlight to provide an output related thereto;

means responsive to the output of said light sensitive means which is related to said attenuated sunlight for controlling the sensitivity of said light sensitive means to light;

means having a predetermined field of view for receiving starlight from any unidentified star in said field of view;

means for energizing said light sensitive means with said starlight to provide a starlight output from said light sensitive means which is proportional to the ratio of the intensities of the light from said unidentified star and said attenuated sunlight the magnitude of said starlight output being within predetermined levels only when said selected star is in the field of view of said star means; and threshold means for providing an output signal indicative of said selected star being in the field of view of said star means in response to a star output of said sensitive means which is within said predetermined levels.

9. The star sensor of claim 9 including means for providing an output signal as a function of the relative position of said selected star in the field of view with respect to the center of said field of view, the magnitude of said output signal being related to the deviation of said star from the center of said field of view and the polarity of said output signal being related to the direction of deviation from the center of said field of view.

10. A star sensor for sensing the star Canopus from the rest of the stars by discriminating between the light from Canopus which differs in intensity by a predetermined magnitude from the intensities of the rest of the stars comprising:

photomultiplying means for providing an output as a function of energizing light directed thereto;

a first optical channel comprising means for receiving and attenuating sunlight to be of an intensity related to the expected intensity of light from Canopus;

a second optical channel having a predetermined field of view comprising means for receiving starlight from an unidentified star in said field of view;

means for modulating said attenuated sunlight and the starlight received from said unidentified star;

means for energizing said photomultiplying means with said modulated sunlight and starlight to provide an output from said photomultiplying means which is a function of the modulated sunlight and starlight;

means for separating said output into first and second signals, said first signal being related to the intensity of said attenuated sunlight;

means for controlling the sensitivity of said photomultiplying means with said first signal whereby said second signal is directly proportional to the ratio of the intensity of the modulated starlight and the modulated sunlight, the magnitude of said second signal being within predetermined levels only when Canopus is in the field of view of said second optical channel; and threshold means responsive to said second signal for providing a Canopus indicating signal only when the magnitude of said second signal is within said predetermined levels.

11. The sensor of claim 10 further including means for detecting the relative direction of Canopus with respect to the center of the field of view of said second optical channel and providing an output signal the magnitude of which is related to the deviation of the direction of Canopus with respect to the center of said field of view and the polarity of which is related to the direction of deviation with respect to the center of the field of view.

References Cited by the Applicant

UNITED STATES PATENTS

| | | |
|---|---|---|
| 2,713,134 | 7/1955 | Eckweiler. |
| 3,001,289 | 9/1961 | Carbonara. |
| 3,015,249 | 1/1962 | Taylor. |
| 3,038,082 | 6/1962 | Biermann. |
| 3,098,934 | 7/1963 | Wilson et al. |
| 3,121,165 | 2/1964 | Astheimer et al. |
| 3,127,516 | 3/1964 | Ammerman et al. |
| 3,137,794 | 6/1964 | Seward. |

RALPH G. NILSON, *Primary Examiner.*

M. ABRAMSON, *Assistant Examiner.*